United States Patent Office 2,949,680
Patented Aug. 23, 1960

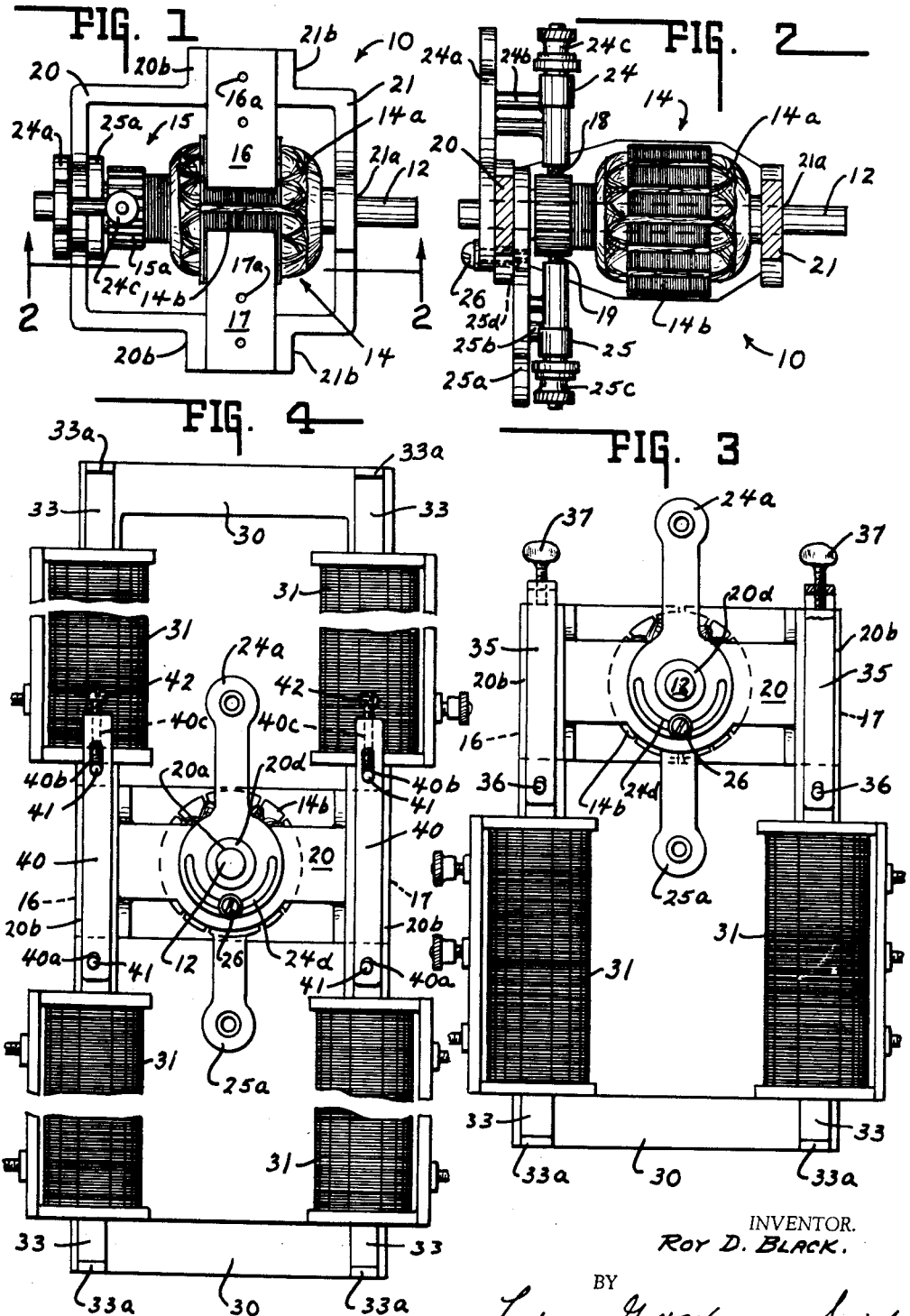

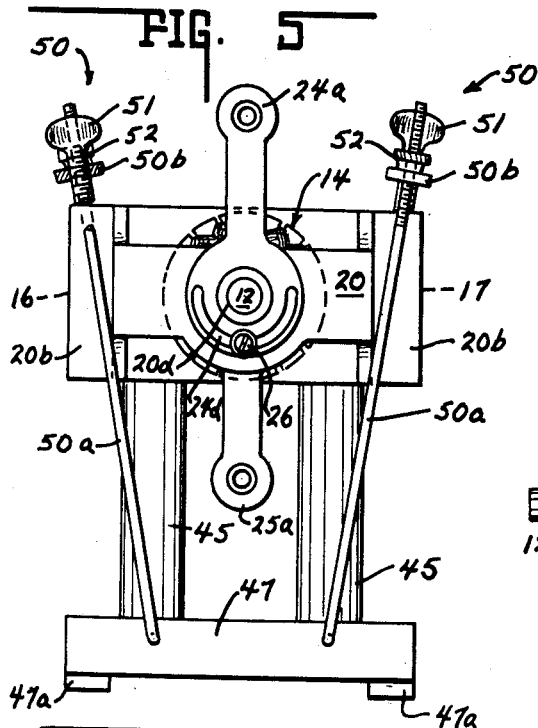
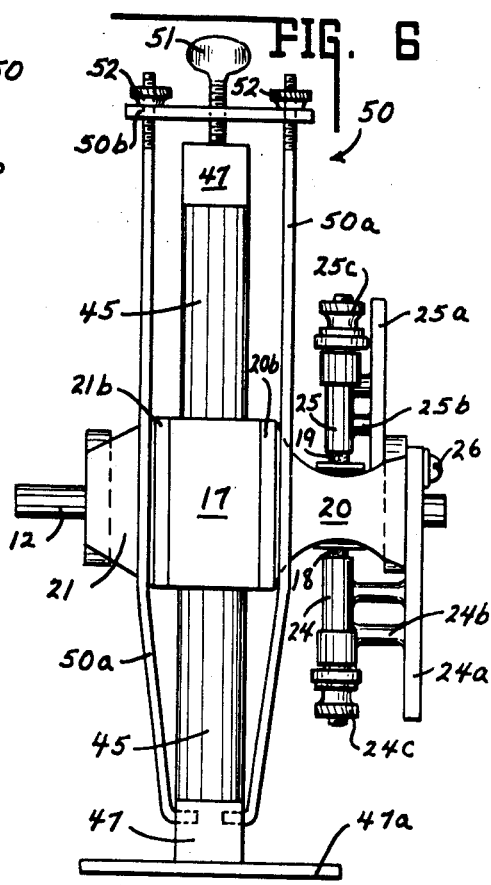
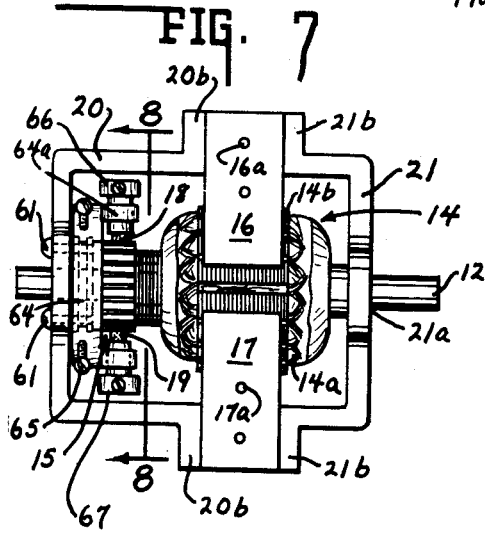
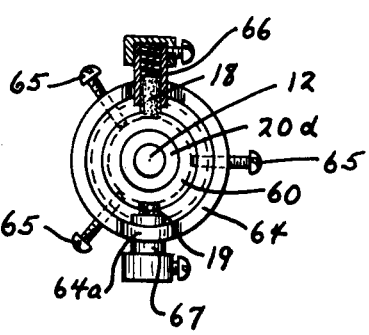

2,949,680

EDUCATIONAL DEVICE FOR TEACHING ELECTRIC MOTOR OR GENERATOR PRINCIPLES

Roy D. Black, Wabash, Ind., assignor to Leonard R. Crow, Vincennes, Ind.

Filed Oct. 10, 1958, Ser. No. 766,423

12 Claims. (Cl. 35—19)

The present invention relates to educational devices and more particularly to a novel structure which is adapted to serve as a teaching aid in the field of electricity and magnetism, whether the instruction is by correspondence or in the classroom.

As is well known, it has been difficult heretofore to effectively teach various principles in the area of electricity and magnetism without using several separate or individual teaching aids, which use oftentimes proved cumbersome and ineffective, as well as costly. Moreover, these prior instructional devices were objectionable in that the teaching of various scientific principles could not be achieved in all instances through desired progressive instruction.

In addition, it has been difficult heretofore to find satisfactory educational devices for teaching motor or generator principles and brush applications to rotating electrical machines in general. Thus, it was extremely difficult to effectively demonstrate with the prior type teaching aid structures the many resultant effects of shifting the electrical brushes in relation to the commutator of generators, motors or other rotating electrical equipment.

By virtue of the present invention, the applicant has provided a novel teaching aid for the field of electricity and magnetism through which the teaching of various scientific principles can be simply and readily achieved. The applicant's novel teaching aid structure comprises a number of interchangeable components which may be readily re-grouped, as desired, for demonstrating a various number of electrical and magnetic phenomena, and in the desired order of difficulty or complexity. Inasmuch as the number of components is maintained at a minimum, the applicant's novel apparatus provides for effective instruction at a low cost.

Moreover, the applicant's invention provides alternate structures for shifting the brushes of an electrical machine with reference to each other and to the commutator thereof to provide for effective demonstration of the results achieved by such rotation or displacement, thereby affording practical instruction in an important study area.

A principal object of the present invention, therefore, is to provide a teaching aid for the field of electricity and magnetism which may be readily assembled for teaching various electrical and magnetic phenomena.

Another object of the present invention is to provide a novel educational device which readily permits progressive demonstration of a series of electrical and magnetic principles.

Another object of the present invention is to provide a novel educational device for the field of electricity and magnetism wherein a minimum number of interchangeable components are utilized to permit the assembly of various effective instructional devices without undue cost to the user.

A further and more general object of the present invention is to provide a teaching aid for motor and generator principles wherein the electrical brushes therefor may assume various radial positions with respect to the commutator.

A still further and more general object of the present invention is to provide an educational device for teaching electrical and magnetic principles formed from components which are interchangeable and capable of effecting various structures, but yet which is generally inexpensive to manufacture and highly effective in the area of correspondence or classroom demonstration.

Other objects and a better understanding of the invention will become more apparent from the following description, taken in conjunction with the accompanying drawings, in which Fig. 1 is a top plan view of the motor or generator used in the applicant's novel educational device;

Fig. 2 is a view in side elevation, partly in section and partly broken away, of the motor or generator of Fig. 1, taken at line 2—2 thereof and looking in the direction of the arrows;

Fig. 3 is a view in front elevation of a typical teaching aid assembled in accordance with the instant invention, showing the use of a single U-core and coil assembly;

Fig. 4 is a view in front elevation, partly broken away, showing another typical teaching aid assembled in accordance with the instant invention, showing the use of two U-core and coil assemblies;

Fig. 5 is a view in front elevation of still another teaching aid assembled in accordance with the instant invention, showing the use of two permanent magnets;

Fig. 6 is a view in side elevation of a typical educational device which employs four permanent magnets;

Fig. 7 is a top plan view of the motor or generator assesmbly of the instant invention, showing an alternate brush holder; and, Fig. 8 is a view in front elevation of the alternate brush holder, taken at line 8—8 of Fig. 7 and looking in the direction of the arrows.

For the purposes of promoting an understanding of the principles of the invention, reference will now be made to the embodiments illustrated in the drawings, and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to Figs. 1 and 2, a motor or generator assembly 10 is disclosed which forms a part of the applicant's novel teaching aid. The motor or generator assembly 10 comprises a rotatable shaft 12 on which an armature 14 and a commutator 15 are disposed in a conventional manner. The armature 14 includes an armature winding 14a which has a series of spaced-apart teeth 14b positioned around the periphery thereof, with the latter being adapted to coact electrically and magnetically with pole pieces 16 and 17, as more particularly shown in Fig. 1.

The commutator 15, which is disposed adjacent the armature 14 on the shaft 12, is formed from a series of spaced-apart commutator segments or bars 15a against which conventional electrical brushes 18 and 19 are urged, to be discussed in detail herebelow. The shaft 12 is positioned in operative relationship with the other components forming the motor or generator assembly 10 through openings 20a and 21a in end bearing brackets 20 and 21, respectively, which surround the assembly 10.

The end bearing brackets 20 and 21 are positioned with respect to the aforementioned pole pieces 16 and 17 through pins (not shown) which extend from the latter into corresponding recesses in flanges 20b and 21b on the end bearing brackets 20 and 21. Threaded machine screws (not shown) are provided to secure the end bearing brackets 20 and 21 onto the pole pieces 16 and 17.

The brushes 18 and 19 are positioned in operative relationship with respect to the commutator segments or bars 15a by brush holders 24 and 25, respectively, which are mounted on insulative brackets 24a and 25a through arms 24b and 25b. It should be noted that the arms 24b and 25b are each of a different length, depending upon the mounting position of the respective insulative brackets 24a and 25a with reference to the end bearing bracket 20, to be discussed herebelow. It should be further understood that the brush holders 24 and 25 are of conventional design and each include a removable end member 24c and 25c for permitting replacement of the brushes 18 and 19 as they become worn.

The end bearing bracket 20 has collars 20d on either side thereof around the opening 20a (see Figs. 3 and 4), which collars 20d are adapted to be received in and position the insulative brackets 24a and 25a through a corresponding opening in each. As should be apparent from the figures, insulative bracket 24a is disposed on the outer surface of the end bearing bracket 20 around the collar 20d thereon, while insulative bracket 25a is disposed on the inner surface of the end bearing bracket 20 around the other collar 20d, which arrangement permits the alignment of the respective brushes 18 and 19 on the commutator segments or bars 15a.

The insulative bracket 24a has a semicircular slot 24d disposed therein adjacent the opening which receives the collar 20d of the end bearing bracket 20. A corresponding semicircular slot (not shown) is provided in the end bearing bracket 20 for receiving a screw 26 which extends through the semicircular slot 24d in the insulative bracket 24a to a threaded opening or hole 25d in the insulative bracket 25a.

Loosening of the screw 26 permits the relative rotational displacement of the brush holders 24 and 25, and hence brushes 18 and 19, with respect to each other and, conversely, the tightening of the screw 26 secures the brush holders 24 and 25 in any desired position. As indicated hereabove, such a novel arrangement affords effective teaching of the resultant electrical characteristics achieved by varying the spaced relationship between the respective electrical brushes.

Fig. 3 discloses a teaching aid in which the above-described novel brush holder structure on the motor-generator unit is used in conjunction with other components, viz. a magnetizable U-core 30 having conventional coils 31 disposed thereon, for teaching the desired electrical and magnetic phenomena. The U-core 30 may be disposed in a normally vertical position by feet 33a formed on strips 33 found on each front and back face of the U-core 30. The motor or generator assembly 10 of Figs. 1 and 2 is secured onto the U-core 30 beneath the pole pieces 16 and 17 through conventional inverted U-clamps 35 which may be placed proximate the flanges 20b and 21b on the end bearing brackets 20 and 21. A small pin 36 is provided for insertion through one arm of each of the U-clamps 35, a hole (not shown) provided in the upper end of the U-core 30, and a hole in the other arm of the U-clamps 35. Thumbscrew type fastening means 37 on each of the U-clamps 35 tighten onto the top surfaces of pole pieces 16 and 17 and serve to secure the components in a firm operational relationship both magnetically and mechanically.

As a highly desirable feature of the applicant's novel educational device is the interchangeability of the various components for forming various types of teaching aid structures, similar reference numerals are used throughout the application to designate like parts. It should be apparent from the specification, therefore, that the applicant has provided for a multiplicity of teaching aids at a minimum of cost to the user.

Referring now to Fig. 4, a teaching aid structure is disclosed therein which is distinguishable from that of Fig. 3 by the use of another U-core assembly having conventional coils thereon. As many of the basic components disclosed in Fig. 4 are common with those of Fig. 3, it is believed that any further discussion thereof would be unnecessary. In broad concept, however, it should be noted that the additional U-core 30, inverted with respect to the U-core 30 forming the base of the structure, is positioned above and on the applicant's novel motor or generator assembly 10. The components forming the alternate teaching aid of Fig. 4 are retained in operative relationship, both mechanically and magnetically, by use of clamping members 40, each of which is generally in the form of a four-sided piece of stock in the form of a straight bar having a hole 40a at one end thereof and a slot 40b at the opposite end thereof. The end surface of each of the clamping members 40 adjacent the slot 40b has a tapped hole 40c therein which opens into the slot 40b. Pins 41 are adapted to pass through the hole 40a and the slot 40b in each clamping member 40, a hole (not shown) in the free end portions of the U-cores 30 and through a hole 40a and a slot 40b in a second clamping member 40 disposed on the opposite side of the structure from the first clamping member and in line therewith. It should be understood that the clamping members 40 are positioned proximate the flanges 20b and 21b on the end bearing brackets 20 and 21. It should be further apparent that, when assembled, the free ends of the upper U-core rest on the top surface of the pole pieces 16 and 17 forming a part of the motor or generator assembly 10.

When assembled, i.e. when the U-cores 30 are placed in their respective positions with reference to the aforesaid pole pieces 16 and 17, pins 41 are inserted through the holes 40a and slots 40b in the respective clamping members 40 and the holes provided in the free ends of the U-cores 30, and screws 42, which extend downwardly in holes 40c in the clamping members 40, are each urged in tightened relation with reference to the pins 41. It should be noted that in the preferred practice, pins 41 are first assembled in the holes 40a of the clamping members 40, the pins 41 are then assembled through the slots 40b of the clamping members 40, which latter step is followed by a tightening of the screws 42.

With this type of assembly, the coils 31 adjacent the pole piece 16 are energized with like or similar polarities, whereas the coils 31 adjacent the pole piece 17 are energized to produce like or similar polarities with respect to each other but of unlike or different polarity with respect to that of coils 31 adjacent pole piece 16. Expressing this concept differently, if the pole ends of the two U-cores 31 in contact with pole piece 16 are both magnetized positively, then the pole ends of the two U-cores 31 in contact with the pole piece 17 are both magnetized negatively. In this manner, a four-coil two-pole generator or motor can be easily assembled which has ready application in the field of educational instruction.

Fig. 5 and Fig. 6 illustrate further typical teaching aids which may be assembled in accordance with the instant invention, with the particular structures disclosed therein employing well known permanent type magnets instead of the electromagnets of Fig. 3 and Fig. 4. Here again, as in Figs. 3 and 4, the applicant's novel motor or generator assembly 10 having the novel rotatable brush mechanism forming a part thereof, is positioned on the permanent magnets 45. The permanent magnets 45 are secured to a core 47 formed of magnetizable material which has feet 47a. The actual fastening of the permanent magnets 45 onto the core 47 is accomplished through the use of typical machine screws (not shown) which pass through openings in the core 47 and into a threaded axial opening or hole in the base portion of each of the permanent magnets 45.

The motor or generator assembly 10 is effectively positioned with reference to the upper ends of permanent magnets 45 by the use of pins (not shown) which extend axially from the free ends of the permanent magnets 45 into recesses 16a and 17a found in the pole pieces 16 and 17, respectively.

The entire teaching aid assembly is maintained in effective mechanical and magnetic engagement by the use of clamping assembly 50 which comprise two armlike members 50a, each having an inturned lower end portion which is adapted to be received in a hole disposed in the core 47. As should be particularly apparent from Fig. 6, the armlike members 50a of the clamping assembly 50 are retained in a predetermined spaced-apart relation at their upper free ends through the use of a connecting bar 50b through which the free ends are inserted. A thumbscrew 51 extends through the connecting bar 50b and into engagement with the pole piece 16 or 17. As each of the thumbscrews 51 is tightened, the connecting bar 50b moves upwardly against nut-like members 52 disposed on the free ends of the armlike members 50a of the clamping assemblies 50, thus effecting a firm and positive relationship between the parts or components forming the overall structure.

The structure of Fig. 6 is similar to that of Fig. 5 except that two additional permanent magnets are used. In this embodiment, clamping assemblies are used similar to that described in connection with Fig. 5 except that the armlike members 50a are lengthened to accommodate the added permanent magnets. Again, as in connection with the teaching aids of Figs. 3 and 4, effective demonstration can be readily accomplished with the structure of Figs. 5 and 6 with a minimum of effort and with the same basic components used in various other instructional units devised in accordance with the instant invention.

Figs. 7 and 8 disclose an alternate type of brush holder assembly wherein the respective brushes 18 and 19 are fixedly retained at positions 180 degrees apart. In this embodiment of the invention, a collar 60 is provided which is adapted to be received on the collar 20d formed on the end bearing bracket 20 of the motor or generator assembly 10. The collar 60, which is preferably secured to the end bearing bracket 20 through screw means 61, has a groove (shown by broken lines in Fig. 7) disposed in the outer peripheral surface thereof. A ring 64 having projections 64a formed thereon is adapted to be received on the collar 60. A plurality of screws 65, radially mounted through the ring 64, are positioned so that the ends thereof engage the groove in the collar 60, when assembled.

Conventional brush holders 66 and 67 having brushes 18 and 19 extending therefrom are mounted in the projections 64a on the ring 64 and are spring urged against the commutator segments or bars 15a in the usual manner. It should be apparent that the ring 64 may be firmly secured to the collar 60, when the screws 65 are tightened, or may be readily rotated thereon, when the screws merely fall within the groove on the collar. Thus, the screw and groove arrangement described hereabove effectively prevents the ring 64 from falling off the collar 60, but yet permits the ready rotational displacement thereof with reference to the commutator 15.

It should be apparent from the preceding that the applicant has provided a novel educational instruction device employing interchangeable components which permit the ready assembly of various teaching aid structures. Moreover, the applicant has provided a highly effective and novel structure for rotating the electrical brushes of a motor-generator assembly forming a part of the educational device with respect to the commutator thereof and each other. As an alternate embodiment of the invention, the applicant has provided a structure wherein the electrical brushes are readily rotatable around the commutator of the motor-generator assembly but are yet maintained in a fixed-apart relation with respect to each other.

The applicant's novel educational device is susceptible to various changes within the spirit of the invention. For example, additional or modified components may be used in conjunction with the apparatus disclosed hereabove to provide other type demonstration units which would readily permit effective demonstration of additional electrical and magnetic phenomena. Thus, the above description is to be considered as illustrative and not as limiting the scope of the following claims.

I claim:

1. In a motor-generator assembly for an educational device having an armature and a commutator disposed on a rotatable shaft, a brush mechanism comprising a first brush holder rotatably positionable on said shaft, a second brush holder rotatably positionable on said shaft independently of said first brush holder, and means retaining said first and said second brush holders within a range of pre-selected positions with respect to each other.

2. The structure of claim 1 where threaded means retain said first and said second brush holders at a pre-selected position with respect to each other.

3. In a motor-generator assembly for an educational device having an armature and a commutator disposed on a rotatable shaft and a collar surrounding said rotatable shaft, a brush mechanism comprising an annular member adapted to be received on said collar and freely rotatable thereon, means releasably positioning said annular member at pre-selected positions around said collar, and brush holders extending from said annular member at fixed positions with respect to each other.

4. The structure of claim 3 where said brush holders are fixedly spaced 180° apart from each other.

5. An educational training aid in the form of an electro-mechanical device comprising a core of magnetizable material, permanent magnets releasably secured to said core of magnetizable material, a motor-generator assembly, said motor-generator assembly having pole pieces and an armature rotatable between said pole pieces, and means detachably securing said pole pieces of said motor-generator assembly to said permanent magnets both mechanically and magnetically.

6. An educational training aid in the form of an electro-mechanical device comprising a U-core of magnetizable material and having spaced parallel legs initially free at one end, a motor-generator assembly, said motor-generator assembly having pole pieces and an armature rotatable between said pole pieces, and means detachably securing said pole pieces of said motor-generator assembly to said ends of said U-core of magnetizable material both mechanically and magnetically.

7. An educational training aid in the form of an electro-mechanical device comprising two cores of magnetizable material, permanent magnets releasably secured to said two cores of magnetizable material, a motor-generator assembly, said motor-generator assembly having pole pieces and an armature rotatable between said pole pieces, and means detachably securing said pole pieces of said motor-generator assembly between said permanent magnets both mechanically and magnetically.

8. An educational training aid in the form of an electro-mechanical device comprising two U-cores of magnetizable material and each having spaced parallel legs initially free at one end, a motor-generator assembly, said motor-generator assembly having pole pieces and an armature rotatable between said pole pieces, and means detachably securing said pole pieces of said motor-generator assembly between said free ends of said U-cores of magnetizable material both mechanically and magnetically.

9. An educational training aid in the form of an electro-mechanical device comprising a motor-generator assembly having an armature and a commutator disposed on a rotatable shaft, a brush mechanism for said motor-generator assembly having a first brush holder rotatably positionable on said shaft, a second brush holder rotatably positionable on said shaft independently of said first brush holder, means retaining said first and second brush holders within a range of pre-selected positions with respect to each other, and means detachably securing said motor-generator assembly to other components both mechanically and magnetically.

10. An educational training aid in the form of an electro-mechanical device comprising a motor-generator assembly having an armature and a commutator disposed on a rotatable shaft and having a collar surrounding said shaft, a brush mechanism for said motor-generator assembly including an annular member adapted to be received on said collar and freely rotatable thereon, means releasably positioning said annular member at pre-selected positions about the periphery of said collar, brush holders extending from said annular member at fixed positions with respect to each other, and means detachably securing said motor-generator assembly to other components both mechanically and magnetically.

11. A motor-generator assembly for an educational device comprising end bracket members, pole pieces removably positioning said end bracket members, an armature rotatable between said pole pieces and positioned by portions of said end bracket members, and means removably securing said pole pieces both magnetically and mechanically to other components.

12. A motor-generator assembly for an educational device comprising end bracket members, pole pieces removably positioning said end bracket members, an armature rotatable between said pole pieces and positioned by portions of said end bracket members, a brush mechanism comprising a first brush holder rotatably positionable on a portion of one of said end bracket members concentric with said shaft, a second brush holder rotatably positionable on another portion of said one of said end bracket members concentric with said shaft but independently of said first brush holder, and means retaining said first and said second brush holders within a range of pre-selected positions with respect to each other.

References Cited in the file of this patent

UNITED STATES PATENTS

| | | |
|---|---|---|
| 440,817 | Rae | Nov. 18, 1890 |
| 603,875 | Crowell | May 10, 1898 |
| 2,098,646 | Lewis | Nov. 9, 1937 |
| 2,866,276 | Zumwalt | Dec. 30, 1958 |

FOREIGN PATENTS

| | | |
|---|---|---|
| 344,961 | Great Britain | Mar. 19, 1931 |

OTHER REFERENCES

Ser. No. 270,788, Latour (A.P.C.), published Apr. 27, 1943.